United States Patent
Moran

(10) Patent No.: US 10,628,800 B2
(45) Date of Patent: Apr. 21, 2020

(54) MEETING LAUNCHER

(71) Applicant: SugarCRM Inc., Cupertino, CA (US)

(72) Inventor: Wes Moran, Merrimack, NH (US)

(73) Assignee: SUGARCRM INC., Cupertino, CA (US)

( * ) Notice: Subject to any disclaimer, the term of this patent is extended or adjusted under 35 U.S.C. 154(b) by 450 days.

(21) Appl. No.: 14/525,671

(22) Filed: Oct. 28, 2014

(65) Prior Publication Data

US 2016/0117645 A1  Apr. 28, 2016

(51) Int. Cl.
*G06Q 10/10* (2012.01)
*H04L 29/06* (2006.01)

(52) U.S. Cl.
CPC ...... *G06Q 10/1095* (2013.01); *H04L 65/1069* (2013.01)

(58) Field of Classification Search
None
See application file for complete search history.

(56) References Cited

U.S. PATENT DOCUMENTS

| | | | | |
|---|---|---|---|---|
| 6,064,977 A * | 5/2000 | Haverstock | ....... | G06F 17/30893 705/7.18 |
| 6,105,043 A * | 8/2000 | Francisco | ............. | G06F 16/972 715/234 |
| 6,363,352 B1 * | 3/2002 | Dailey | ............... | G06Q 10/1095 705/7.19 |
| 6,505,167 B1 * | 1/2003 | Horvitz | ............ | G06Q 10/06314 705/7.21 |
| 6,785,868 B1 * | 8/2004 | Raff | ...................... | G06Q 10/109 707/999.01 |
| 8,111,282 B2 * | 2/2012 | Cutler | ...................... | H04N 7/15 348/14.01 |

(Continued)

FOREIGN PATENT DOCUMENTS

| EP | 1661024 B1 * | 7/2012 | ........... G06F 17/289 |
|---|---|---|---|
| EP | 2501118 B1 * | 5/2014 | ............ H04M 3/565 |

(Continued)

OTHER PUBLICATIONS

Chen, H; Hsu, P; Orwig, R; Hoopes, L; Nunamaker, JF. Association for Computing Machinery. Communications of the ACM 37.10: 56. New York: Association for Computing Machinery. (Oct. 1994).*

(Continued)

*Primary Examiner* — Thomas L Mansfield
*Assistant Examiner* — Derick J Holzmacher
(74) *Attorney, Agent, or Firm* — Steven M. Greenberg, Esq.; Shutts & Bowen LLP

(57) ABSTRACT

Embodiments of the present provide a method, system and computer program product for the automated launching of an e-meeting. In an embodiment of the invention, a method for meeting invite management includes creating in a C&S system an event from an e-mail invite to attend an e-meeting. Subsequently, the invite is parsed to extract into memory a hyperlink to the e-meeting, a user identifier and password. Thereafter, macro logic is generated that is programmed to access the e-meeting at the hyperlink and to authenticate into the e-meeting utilizing the user identifier and password. Finally, the macro logic is associated with a user interface control and the user interface control is embedded into the created event in the C&S system.

6 Claims, 2 Drawing Sheets

(56) References Cited

U.S. PATENT DOCUMENTS

| | | | | |
|---|---|---|---|---|
| 8,171,104 B2* | 5/2012 | Qi | G06Q 10/06311 | 705/7.13 |
| 8,296,379 B2* | 10/2012 | Chen | G06Q 10/109 | 709/204 |
| 8,370,432 B2* | 2/2013 | Digate | G06Q 10/107 | 370/401 |
| 8,416,928 B2* | 4/2013 | Ramamoorthy | H04M 1/274516 | 379/88.03 |
| 8,488,764 B1* | 7/2013 | Swartz | H04M 3/565 | 370/261 |
| 8,577,974 B2* | 11/2013 | Paulsami | G06Q 10/1095 | 709/206 |
| 8,600,027 B1* | 12/2013 | Doerr | H04M 3/565 | 379/202.01 |
| 8,676,868 B2* | 3/2014 | Jones | G06F 16/957 | 707/899 |
| 8,819,129 B1* | 8/2014 | Cyriac | H04L 65/1046 | 709/204 |
| 8,831,582 B1* | 9/2014 | Haid | H04M 3/56 | 370/260 |
| 8,850,522 B2* | 9/2014 | Vakil | G06F 21/31 | 715/753 |
| 8,855,285 B1* | 10/2014 | Bracken | H04M 3/42119 | 379/202.01 |
| 8,990,329 B1* | 3/2015 | Khvostichenko | G06Q 10/1095 | 709/206 |
| 9,049,074 B2* | 6/2015 | Teng | G06Q 10/109 | |
| 9,130,975 B2* | 9/2015 | Chou | H04L 67/02 | |
| 10,033,873 B1* | 7/2018 | Roberts | H04M 3/563 | |
| 2003/0191772 A1* | 10/2003 | Schaumann | G06Q 10/109 | |
| 2005/0033615 A1* | 2/2005 | Nguyen | G06Q 10/02 | 705/5 |
| 2007/0033251 A1* | 2/2007 | Mandalia | G06Q 10/109 | 709/204 |
| 2007/0244976 A1* | 10/2007 | Carroll | G06Q 10/107 | 709/206 |
| 2008/0037745 A1* | 2/2008 | Ramamoorthy | H04M 3/56 | 379/201.01 |
| 2008/0205616 A1* | 8/2008 | Teng | G06Q 10/109 | 379/202.01 |
| 2008/0226051 A1* | 9/2008 | Srinivasan | H04L 12/1822 | 379/202.01 |
| 2009/0070755 A1* | 3/2009 | Taylor | G06F 8/71 | 717/168 |
| 2009/0240770 A1* | 9/2009 | Kalipatnapu | H04L 12/1818 | 709/204 |
| 2010/0064172 A1* | 3/2010 | George | H04L 67/14 | 714/15 |
| 2011/0040824 A1* | 2/2011 | Harm | G06F 9/45529 | 709/203 |
| 2011/0041140 A1* | 2/2011 | Harm | G06F 9/4843 | 719/318 |
| 2011/0228922 A1* | 9/2011 | Dhara | H04L 12/1818 | 379/202.01 |
| 2012/0005278 A1* | 1/2012 | Muller | G06Q 10/1095 | 709/206 |
| 2012/0131645 A1* | 5/2012 | Harm | G06F 21/6218 | 726/4 |
| 2012/0150956 A1* | 6/2012 | Tucker | H04L 65/1069 | 709/204 |
| 2012/0198016 A1* | 8/2012 | Pousti | G06F 8/10 | 709/206 |
| 2012/0269333 A1* | 10/2012 | Goguen | H04M 3/565 | 379/202.01 |
| 2013/0013364 A1* | 1/2013 | Beers | G06Q 10/0637 | 705/7.19 |
| 2013/0018950 A1* | 1/2013 | Narayanan | H04L 65/403 | 709/204 |
| 2013/0212494 A1* | 8/2013 | Heiferman | G06Q 10/1095 | 715/753 |
| 2014/0051383 A1* | 2/2014 | Doerr | H04W 4/16 | 455/405 |
| 2014/0066036 A1* | 3/2014 | Haid | H04M 3/56 | 455/416 |
| 2014/0098947 A1* | 4/2014 | Dingsor | H04M 3/565 | 379/202.01 |
| 2014/0172483 A1* | 6/2014 | Bellers | G06Q 10/1095 | 705/7.16 |
| 2015/0112749 A1* | 4/2015 | Erdal | G06F 3/04842 | 705/7.19 |
| 2015/0120374 A1* | 4/2015 | Kolegayev | G06Q 10/06316 | 705/7.26 |

FOREIGN PATENT DOCUMENTS

| | | | | |
|---|---|---|---|---|
| EP | 2743869 A1 * | 6/2014 | | G06Q 10/1095 |
| WO | WO 03049438 A1 * | 6/2003 | | H04L 41/22 |
| WO | WO-03049438 A1 * | 6/2003 | | H04L 41/22 |
| WO | WO 2006114386 A1 * | 11/2006 | | G06Q 10/06311 |
| WO | WO-2006114386 A1 * | 11/2006 | | G06Q 10/109 |
| WO | WO 2007068651 A1 * | 6/2007 | | G06Q 10/06311 |
| WO | WO-2007068651 A1 * | 6/2007 | | G06Q 10/063116 |

OTHER PUBLICATIONS

Jung, Soonchul, Mi-Kyoung Kang, and Dae-Woo Choi. "Call/messaging open API for telecommunication services." 2008 10th International Conference on Advanced Communication Technology. vol. 2. IEEE, 2008. (Year: 2008).*

Koskelainen, Petri, Henning Schulzrinne, and Xiaotao Wu. "A SIP-based conference control framework." Proceedings of the 12th international workshop on Network and operating systems support for digital audio and video. ACM, 2002. (Year: 2002).*

* cited by examiner

MEETING LAUNCHER

BACKGROUND OF THE INVENTION

Field of the Invention

The present invention relates to calendaring and scheduling (C&S) and more particularly to meeting scheduling in a C&S system.

Description of the Related Art

Individuals worldwide can converge over a communications network to share ideas, documents, sound and images without needing to be in the same room. Technology facilitates this through multipoint audio conferencing, video conferencing over traditional networks, and many forms of conferencing over the Internet. A substantial collection of technologies and protocols has been assembled to effectively deliver audio, video, and data over the single digital communications medium of the Internet.

An e-meeting represents one popular form of electronic collaboration. In an e-meeting, participants can view a common space, for instance a whiteboard or a shared application (or both), through which ideas can be exchanged. The viewing of the common space can be complemented with a teleconference, a videoconference, an instant messaging session, or any combination thereof, such that the meeting can act as a near substitute for an in-person meeting in a conference room.

Collaborators who participate in e-meetings often maintain a personal schedule managed by a scheduling system. Collaborators can schedule e-meetings within the personal schedule sua sponte, or the collaborators can schedule e-meetings responsive to the receipt of an invitation. An invitation typically contains data regarding the e-meeting such as a topic, list of invitees, and most importantly, a date, time and online location for the e-meeting. Using this data, the invitee can be prompted either to accept or decline the invitation. Oftentimes, the acceptance or declination of an invitation can be accomplished with a single user action such as a mouse click.

Once an e-meeting has been scheduled and the selected participants notified, prior to the scheduled occurrence of the e-meeting one or more e-meeting confirmations can be issued to the selected participants who have accepted the originally issued invitation. Traditionally, an e-meeting confirmation is an e-mail reminder provided by the e-meeting organizer and transmitted manually to the selected participants. Of course, the successful transmission of an e-meeting confirmation depends entirely upon the e-meeting organizer remembering to draft and send the e-meeting confirmation.

Once the moment has arrived for the commencement of a scheduled e-meeting, the different participants must navigate a Web browser to a specific uniform resource locator (URL) through which the e-meeting can be accessed. Additional parameters may be specified depending upon the nature of the e-meeting system, for example a first name, a last name, a phone number, a passcode and the like. Of course, each e-meeting system is different. Consequently, for the end user seeking to begin an e-meeting, the process of actually entering the virtualized e-meeting room can be manually intensive and especially frustrating when attempted through a mobile device or when attempted at a time when the end user has limited ability to interact with a keyboard and mouse.

BRIEF SUMMARY OF THE INVENTION

Embodiments of the present invention address deficiencies of the art in respect to e-meeting management and provide a novel and non-obvious method, system and computer program product for the automated launching of an e-meeting. In an embodiment of the invention, a method for meeting invite management includes creating in a C&S system an event from an e-mail invite to attend an e-meeting. Subsequently, the invite is parsed to extract into memory a hyperlink to the e-meeting, a user identifier and password. Thereafter, macro logic is generated that is programmed to access the e-meeting at the hyperlink and to authenticate into the e-meeting utilizing the user identifier and password. Finally, the macro logic is associated with a user interface control and the user interface control is embedded into the created event in the C&S system.

Consequently, in response to a selection of the user interface control within the created event, the macro logic is executed to cause a Web browser to access and authenticate into the e-meeting. In one aspect of the embodiment, the invite is parsed also to extract an audio telephone number. As such, the macro logic is generated to include a programmatic instruction to direct a phone dialer to dial the audio telephone number such that the macro logic upon execution also directs the dialing by the phone dialer of the audio telephone number. As an additional option, the macro logic is generated to include a programmatic instruction to log the dialing by the phone dialer. In another aspect of the embodiment, the macro logic is generated to include a programmatic instruction to direct recording of the e-meeting. In yet another aspect of the embodiment, the macro logic is generated to include a programmatic instruction to activate a video camera for use in the e-meeting.

In another embodiment of the invention, an e-meeting data processing system is configured for automated launching of an e-meeting. The system includes a host computing system that includes one or more computers each with memory and at least one processor. The system also includes a C&S data processing system executing in the memory of the host computing system and being coupled to a mail server. The system yet further includes a meeting launcher module coupled to the C&S data processing system and executing in the memory of the host computing system. The module includes program code configured upon execution in the memory of the host computing system to respond to the creation in the C&S system of an event from an e-mail invite to attend an e-meeting as received in the mail server, by parsing the invite to extract a hyperlink to the e-meeting, a user identifier and password, and by generating macro logic programmed to access the e-meeting at the hyperlink and to authenticate into the e-meeting utilizing the user identifier and password. The program code also is configured to associate the macro logic with a user interface control such that a selection of the user interface control triggers execution of the macro logic. Finally, the program code is configured to embed the user interface control into the created event in the C&S system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for automated launching of an e-meeting. In accordance with an embodiment of the invention, a meeting invite can be received by way of an e-mail message inviting the recipient to attend an e-meeting. The meeting invite can be parsed to extract into memory a hyperlink to the e-meeting, and a user identifier and password for the recipient. Optionally, one or more auxiliary parameters such as a PIN or audio telephone number can be extracted as well. Thereafter, macro logic can be generated such that the logic includes instructions to access the e-meeting at the hyperlink and to authenticate into the e-meeting utilizing the user identifier and password. Optionally, instructions also can include a directive to a phone dialer to dial the extracted audio telephone number and to provide telephonically the PIN. The macro logic then can be associated with a user interface control, such as a button and the user interface control can be embedded into meeting scheduled within a C&S system. As such, in response to a selection of the user interface control, the macro logic can be executed to cause a Web browser to access and authenticate into the online meeting, and optionally to initiate the dialing of the audio telephone number.

Figure 1:
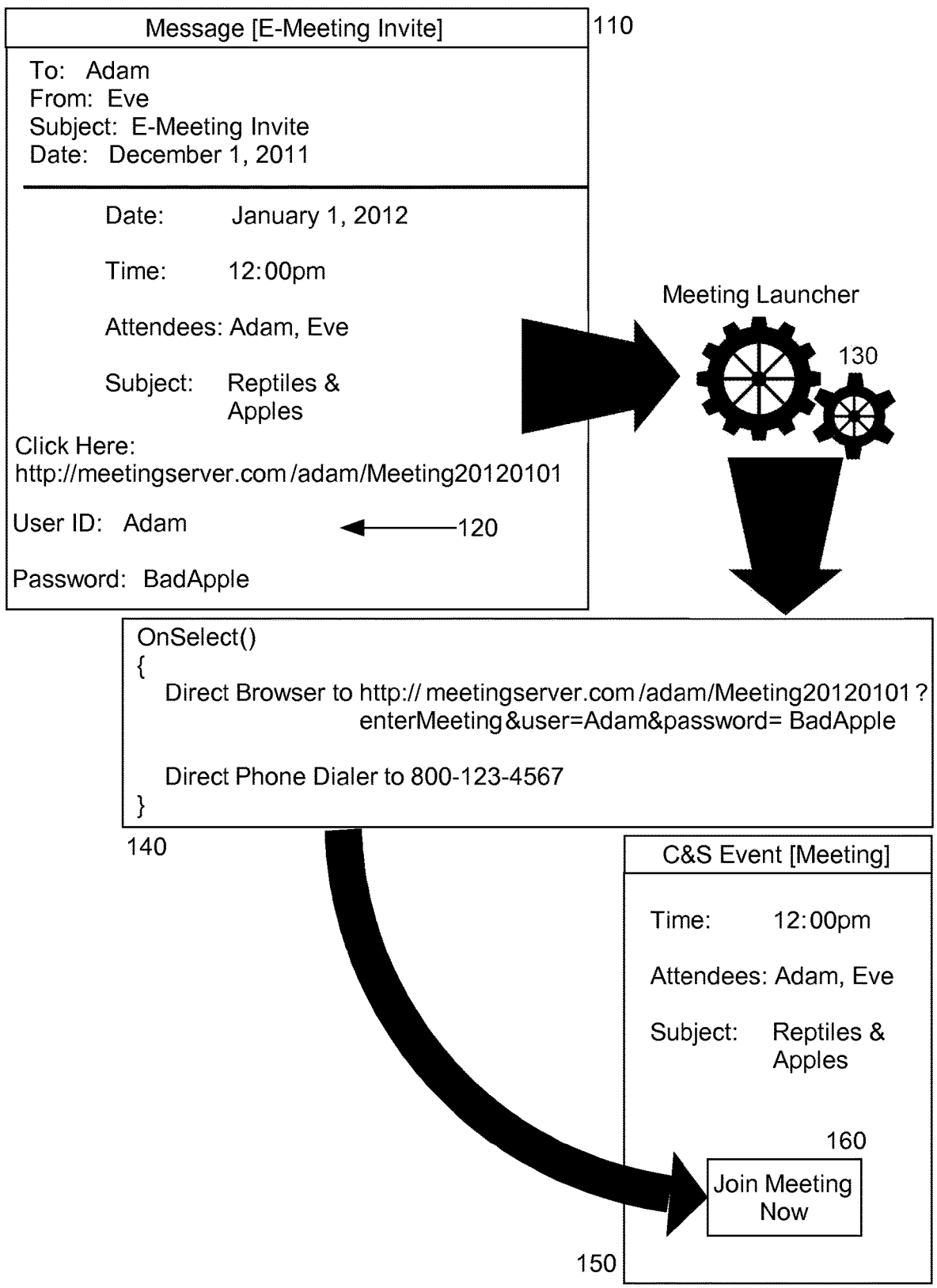
FIG. 1 is a pictorial illustration of a process for automated launching of an e-meeting.

In further illustration, FIG. 1 pictorially shows a process for automated launching of an e-meeting. As shown in FIG. 1, an e-mail message 110 can be received that includes an e-meeting invite 120. The e-meeting invite 120 can specify, by way of example, a hyperlink to a meeting server at which an e-meeting will occur. The e-meeting invite 120 also can specify a user identifier and a password for the invited recipient of the invite 120. Optionally, the e-meeting invite 120 can specify an audio telephone number and as an additional option, one or more identification codes such as a conference number or personal identification number (PIN) at which an audio conference can be initiated.

Meeting launcher 130 can parse the e-mail to identify the e-meeting invite 120 and to extract therefrom, the hyperlink, any authentication data such as a user identifier and password, and any optional information. The meeting launcher 130 then can generate macro code 140 to be executed upon the selection or activation of a user interface control 160 embedded in an event 150 created for the e-meeting and stored in a C&S system. In this regard, the macro code 140 can include an instruction to navigate a browser to the hyperlink extracted from the e-meeting invite 120 and to present the authentication data extracted from the e-meeting invite 120. Optionally, the macro code 140 can include an instruction to direct a phone dialer to dial a phone number extracted from the e-meeting invite 120 and to dial any identification numbers also extracted from the e-meeting invite 120. In this way, a single click of the user interface control 150 within the event 150 of the C&S system can automatically result in the launching of the e-meeting without requiring tedious manual intervention.

Figure 2:
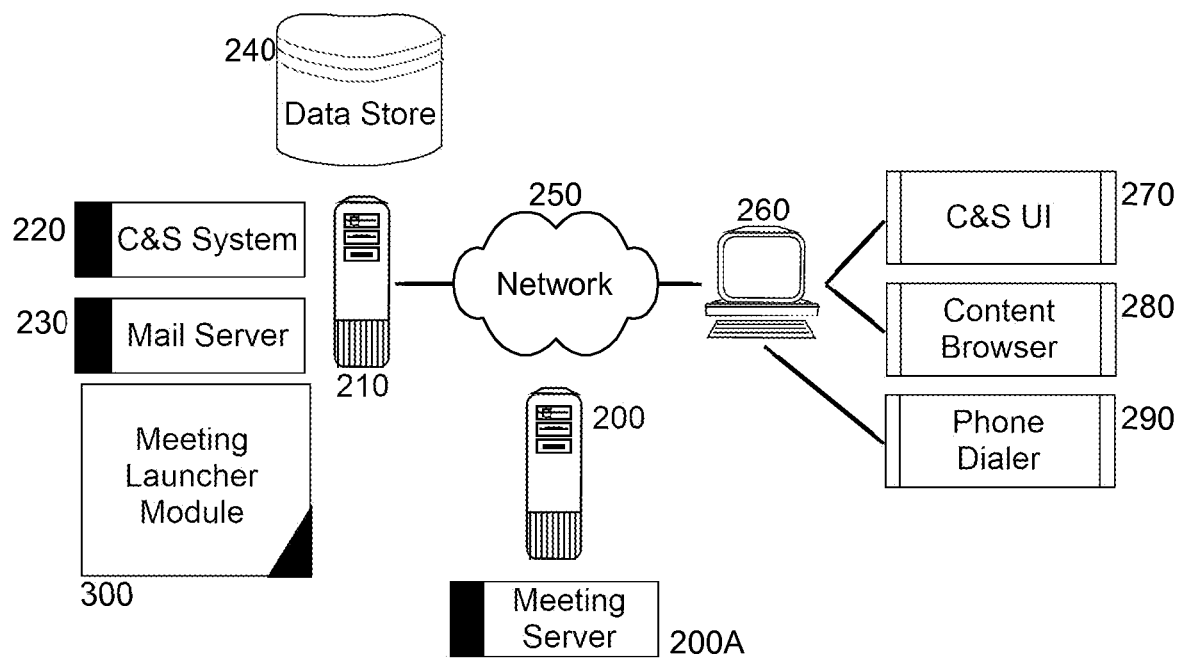
FIG. 2 is a schematic illustration of an e-meeting data processing system configured for automated launching of an e-meeting; and, FIG. 3 is a flow chart illustrating a process for automated launching of an e-meeting.

The process described in connection with FIG. 1 can be implemented within an e-meeting data processing system. In yet further illustration, FIG. 2 schematically shows an e-meeting data processing system configured for automated launching of an e-meeting. The system can include a host computing system 210 that can include one or more computers each with memory and at least one processor. The host computing system 210 can support the execution of both a C&S system 220 and also a mail server 230, both accessible to different computing clients 260 over computer communications network 250. In this regard, the data of the C&S system can be stored in a data store 240 and accessed through a C&S user interface 270 displayed in a corresponding computing client 260.

Of note, a meeting launcher module 300 can be coupled to the C&S system 220 and the mail server 230. The meeting launcher module 300 can include program code that when executing in the memory of the host computing system 210 can be enabled to process an e-mail containing an e-meeting invite by extracting therefrom a hyperlink to an e-meeting scheduled to hosted by an e-meeting server 200A executing in corresponding computing system 200. The program code also can be enabled to extract authentication data to attend the e-meeting. Optionally, the program code can be enabled to extract phone dialing information to connect to an audio conference that coincides with the e-meeting.

The program code of the meeting launcher module 300 further can be enabled to generate macro logic including a directive to navigate the content browser 280 to the meeting server 200A at the extracted hyperlink and to authenticate therein utilizing the extracted authentication data. The program code of the meeting launcher module 300 yet further can be enabled as an option to direct the dialing by a phone dialer 290 to an extracted audio telephone number. As an additional option, the program code of the meeting launcher module 300 can be enabled to consult one or more configuration settings of the meeting launcher module 300 and in response thereto, the program code of the meeting launcher module 300 can be enabled to generate the macro logic to include a programmatic instruction to log the dialing by the phone dialer, or to include a programmatic instruction to direct recording of the e-meeting, or to include a programmatic instruction to activate a video camera for use in the e-meeting, or any combination thereof. Finally, the program code of the meeting launcher module 300 can be enabled to associate the macro code with a user interface control such as a button, and to embed the user interface control in an event created in the C&S system 220 for the e-meeting.

Figure 3:
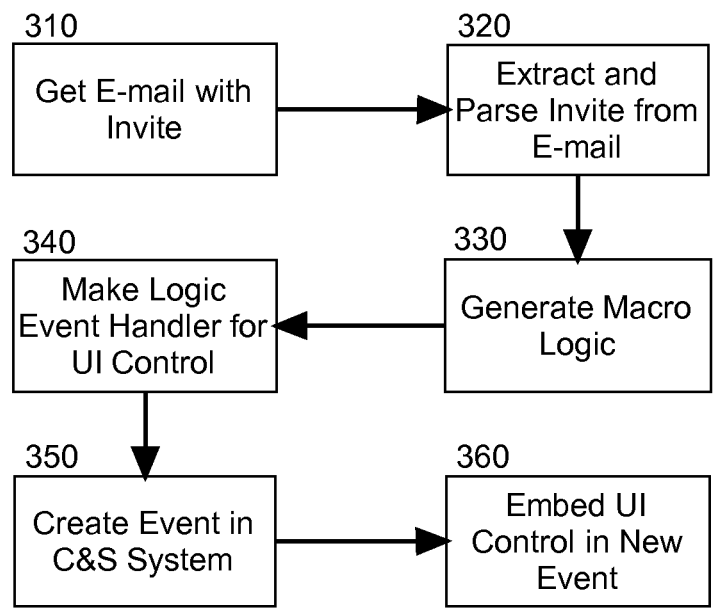

In even yet further illustration of the operation of the meeting launcher module 300, FIG. 3 is a flow chart illustrating a process for automated launching of an e-meeting. Beginning in block 310, an e-mail can be received in a mail server that includes a meeting invite for an e-meeting hosted by an e-meeting server. In block 320, the invite can be extracted from the e-mail and parsed to identify a hyperlink to the e-meeting at the e-meeting server and authentication data for the recipient of the e-mail. In block 330, macro logic can be generated directing upon execution the navigation by a content browser to the hyperlink along with the authentication data. In block 340, the macro logic can be associated with a user interface control as an event handler for a selection or activation event. In block 350, an event can be created in the C&S system for the e-meeting and in block 360, the user interface control can be embedded in the new event.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

I claim:

1. A method for meeting invite management comprising:
   creating in a calendaring and scheduling (C&S) system an event proposed by an e-mail invite that has been embedded as content in an e-mail message to attend an e-meeting, the event not yet having been scheduled in the C&S system;
   parsing the e-mail invite and content of the e-mail message to extract into memory an audio telephone number, a hyperlink to the e-meeting, a user identifier and password;
   generating macro logic programmed to direct a phone dialer to dial the audio telephone number and log the dialing by the phone dialer, macro logic programmed to access the e-meeting at the hyperlink and to authenticate into the e-meeting utilizing the user identifier and password, macro logic programmed to activate a video camera for use in the e-meeting and macro logic programmed to direct recording of the meeting;
   associating the macro logic with a first user interface control to access and authenticate into the e-meeting, activate the video camera for use in the e-meeting and direct recording of the meeting and a second user interface control to direct the phone dialer to dial the audio telephone number, log the dialing by the phone dialer and direct recording of the meeting;
   embedding the first and second user interface control into the created event in the C&S system so that the control is part of the created event; and,
   responsive to a selection of the first user interface control within the created event, executing the macro logic to cause a Web browser to access and authenticate into the e-meeting and cause the C&S system to activate the video camera for use in the e-meeting and record the e-meeting and responsive to a selection of the second user interface control within the created event, executing the macro logic to direct the phone dialer to dial the audio telephone number, log the dialing by the phone dialer and cause the C&S system to record the e-meeting.

2. The method of claim 1, wherein the first and second user interface control is a button.

3. An e-meeting data processing system configured for automated launching of an e-meeting, the system comprising:
   a host computing system comprising one or more computers each with memory and at least one processor;
   a calendaring and scheduling (C&S) data processing system executing in the memory of the host computing system and being coupled to a mail server; and,
   a meeting launcher module coupled to the C&S data processing system and executing in the memory of the host computing system the module comprising program code configured upon execution in the memory of the host computing system to respond to the creation in the C&S system of an event proposed by an e-mail invite that has been embedded as content in an e-mail message to attend an e-meeting as received in the mail server, the event not yet having been scheduled in the C&S system, by parsing the e-mail invite and content of the e-mail message to extract an audio telephone number, a hyperlink to the e-meeting, a user identifier and password, by generating macro logic programmed to direct a phone dialer to dial the audio telephone number, direct recording of the meeting and log the dialing by the phone dialer, macro logic programmed to access the e-meeting at the hyperlink and to authenticate into the e-meeting utilizing the user identifier and password, macro logic programmed to activate a video camera for use in the e-meeting and macro logic programmed to direct recording of the meeting, by associating the macro logic with a first user interface control to access and authenticate into the e-meeting, activate the video camera for use in the e-meeting and direct recording of the meeting and a second user interface control to direct the phone dialer to dial the audio telephone number, log the dialing by the phone dialer and direct recording of the meeting such that a selection of the user interface control triggers execution of the macro logic, and by embedding the first and second user interface control into the created event in the C&S system so that the control is part of the created event.

4. The system of claim 3, wherein the first and second user interface control is a button.

5. A computer program product for meeting invite management, the computer program product comprising a non-transitory computer readable storage medium having program instructions embodied therewith, the program instructions executable by a device to cause the device to perform a method comprising:
   creating in a calendaring and scheduling (C&S) system an event proposed by an e-mail invite that has been embedded as content in an e-mail message to attend an e-meeting, the event not yet having been scheduled in the C&S system;
   parsing the e-mail invite and content of the e-mail message to extract into memory an audio telephone number, a hyperlink to the e-meeting, a user identifier and password;
   generating macro logic programmed to direct a phone dialer to dial the audio telephone number and log the dialing by the phone dialer, macro logic programmed to access the e-meeting at the hyperlink and to authenticate into the e-meeting utilizing the user identifier and password, macro logic programmed to activate a video camera for use in the e-meeting and macro logic programmed to direct recording of the meeting;

associating the macro logic with a first user interface control to access and authenticate into the e-meeting, activate the video camera for use in the e-meeting and direct recording of the meeting and a second user interface control to direct the phone dialer to dial the audio telephone number, log the dialing by the phone dialer and direct recording of the meeting;

embedding the first and second user interface control into the created event in the C&S system so that the control is part of the created event; and, responsive to a selection of the first user interface control within the created event, executing the macro logic to cause a Web browser to access and authenticate into the e-meeting and cause the C&S system to activate the video camera for use in the e-meeting and record the e-meeting and responsive to a selection of the second user interface control within the created event, executing the macro logic to direct the phone dialer to dial the audio telephone number, log the dialing by the phone dialer and cause the C&S system to record the e-meeting.

6. The computer program product of claim 5, wherein the first and second user interface control is a button.

* * * * *